US012679013B2

(12) United States Patent
Wang et al.

(10) Patent No.: US 12,679,013 B2
(45) Date of Patent: Jul. 14, 2026

(54) TRANSFER MOLDING MOLD AND TRANSFER MOLDING APPARATUS FOR VULCANIZED RUBBER BOOTS

(71) Applicant: EAST ROCK UNION LIMITED, Beijing (CN)

(72) Inventors: Jue Wang, Beijing (CN); Yongjiang Zong, Beijing (CN)

(73) Assignee: EAST ROCK UNION LIMITED, Beijing (CN)

( * ) Notice: Subject to any disclaimer, the term of this patent is extended or adjusted under 35 U.S.C. 154(b) by 136 days.

(21) Appl. No.: 18/555,191

(22) PCT Filed: Apr. 12, 2022

(86) PCT No.: PCT/CN2022/086335
§ 371 (c)(1),
(2) Date: Oct. 12, 2023

(87) PCT Pub. No.: WO2022/218301
PCT Pub. Date: Oct. 20, 2022

(65) Prior Publication Data
US 2024/0190055 A1     Jun. 13, 2024

(30) Foreign Application Priority Data

Apr. 12, 2021     (CN) ......................... 202110391016.X

(51) Int. Cl.
*B29C 45/26*          (2006.01)
*B29C 45/02*          (2006.01)
(Continued)

(52) U.S. Cl.
CPC .......... *B29C 45/2602* (2013.01); *B29C 45/02* (2013.01); *B29C 45/27* (2013.01);
(Continued)

(58) Field of Classification Search
CPC ..... B29C 45/7602; B29C 45/02; B29C 45/77; B29C 45/33; B29K 2021/00; B29L 2031/501
(Continued)

(56) References Cited

FOREIGN PATENT DOCUMENTS

| | | |
|---|---|---|
| CN | 109109274 A | 1/2019 |
| CN | 111284053 A | 6/2020 |

(Continued)

OTHER PUBLICATIONS

China National Intellectual Property Administration, International Search Report of International Patent Application No. PCT/CN2022/086335, dated Jul. 12, 2022.

*Primary Examiner* — Christina A Johnson
*Assistant Examiner* — Xue H Liu
(74) *Attorney, Agent, or Firm* — Cherskov Flaynik & Gurda, LLC

(57)          ABSTRACT

A die-casting forming mold for vulcanized rubber boots, comprising: a combined shaft mold provided with an inner cavity corresponding to a shaft of a rubber boot; a last mold 21 provided with partition elements, comprising a body substantially corresponding to the shaft of the rubber boot in shape, and two or more partition elements disposed on the body, the last mold 21 being adapted to be mounted in the inner cavity of the shaft mold to form a die-casting forming cavity between the wall of the inner cavity of the shaft mold and the outer surface of the last mold 21, and the die-casting forming cavity being divided into two or more portions by the last mold 21 and the shaft mold, wherein the last mold 21 further comprises: a longitudinally extending rubber injection channel extending longitudinally downward from the upper surface of the last mold 21, and a transversely extending rubber injection channel extending transversely from the longitudinally extending rubber injection channel (Continued)

to a rubber outlet in the surface of the last mold 21; and a rubber injection plate 5 adapted to be mounted to the top of the shaft mold to guide the injection of an unvulcanized mixed rubber material, the rubber injection plate 5 being provided with: a rubber injection hole 11 adapted to be connected to an external injection head to inject the unvulcanized mixed rubber material, and a rubber injection channel for communicating the rubber injection hole 11 with the longitudinally extending rubber injection channel.

20 Claims, 9 Drawing Sheets

(51) Int. Cl.

| | | |
|---|---|---|
| *B29C 45/27* | (2006.01) | |
| *B29C 45/33* | (2006.01) | |
| *B29K 21/00* | (2006.01) | |
| *B29L 31/50* | (2006.01) | |

(52) U.S. Cl.
CPC .......... *B29C 45/33* (2013.01); *B29K 2021/00* (2013.01); *B29L 2031/501* (2013.01)

(58) Field of Classification Search
USPC ........................................................ 425/116
See application file for complete search history.

(56) References Cited

FOREIGN PATENT DOCUMENTS

| CN | 111284054 A | 6/2020 |
|---|---|---|
| CN | 212372541 U | 1/2021 |
| JP | 2020121476 A | 8/2020 |

TRANSFER MOLDING MOLD AND TRANSFER MOLDING APPARATUS FOR VULCANIZED RUBBER BOOTS

CROSS-REFERENCE TO RELATED APPLICATIONS

The present application claims the priority to and benefit of Chinese Patent Application No. CN202110391016.X filed on Apr. 12, 2021, the disclosure of which is incorporated herein by reference in its entirety.

FIELDS OF THE INVENTION

The disclosure relates to a transfer molding mold and a transfer molding apparatus for vulcanized rubber boot.

BACKGROUND OF THE INVENTION

Vulcanized rubber boots have been widely used in various industries, such as worker safety, firefighting, fishery, outdoor sports, and fashion, which have high requirements for waterproof performance. For some specific operating environments, the insides of vulcanized rubber boots may need to be lined with boot linings, especially boot linings with foam materials and thermal insulation materials.

However, it is difficult to achieve overall transfer molding of rubber materials in the manufacturing industry of vulcanized rubber boots at present due to the characteristic of poor flow characteristics, which is different from PVC materials or the like, and semi-automated production lines are dominant in the industry.

In a semi-automated production line, rubber sheets having predetermined shapes and thicknesses are manufactured by the processes of mixing, extrusion, calendering etc. A worker puts a boot lining on a last in the production line, and firmly applies the pre-manufactured rubber sheets of various shapes to the boot lining in a predetermined manner to form a tube of a vulcanized rubber boot. Depending on different processes, a pre-manufactured sole may be cemented to the tube of the vulcanized rubber boot before or after vulcanization to complete the overall manufacturing.

In order to detect air or water leakage, a special equipment is required to manually test the tube or the entire vulcanized rubber boot. Generally, since the tube is formed by manually stacking the rubber sheets, it is fairly common that the vulcanized rubber boot manufactured in this way has parts with water leakage. Some parts are difficult to repair in the subsequent process, so the scrap rate is quite high, which greatly increases the production cost of vulcanized rubber boots.

The patent literatures WO2020/114024A and WO2020/114170A disclose a production process of guiding the vulcanized rubber circularly into a mold, respectively, which may reduce the required process pressure.

An optimized apparatus and/or process for manufacturing vulcanized rubber boot is needed in the industry.

SUMMARY OF THE INVENTION

Embodiments of the disclosure provide an optimized apparatus and/or process for manufacturing vulcanized rubber boot by improving the manner of guiding vulcanized rubber into a mold.

In an aspect of the disclosure, there is provide a transfer molding mold for vulcanized rubber boot, comprising:

a combined tube mold having an inner cavity corresponding to a tube of the rubber boot;

a last mold with partition elements, comprising a body substantially corresponding to a shape of the tube of the rubber boot and two or more partition elements provided on the body; the last mold being adapted to mount in the inner cavity of the tube mold so as to form a transfer molding cavity between a wall of the inner cavity of the tube mold and an outer surface of the last mold, the transfer molding cavity being partitioned into two or more parts by the last mold and the tube mold, wherein the last mold further comprises a longitudinally extending rubber injection channel extending longitudinally downward from an upper surface of the last mold and a transversely extending rubber injection channel extending transversely from the longitudinally extending rubber injection channel to a rubber outlet on the surface of the last mold; and a rubber injection guiding plate adapted to be mounted to the top of the tube mold so as to guide injection of unvulcanized mixed rubber, the rubber injection guiding plate is provided with a rubber injection hole adapted to connect to an external injection head for injecting the unvulcanized mixed rubber, and a rubber injection channel which communicates the rubber injection hole to the longitudinally extending rubber injection channel.

Preferably, the transfer molding mold comprises two or more longitudinally extending rubber injection channels distributed along a longitudinal section of the last mold.

Preferably, the rubber injection channels of the rubber injection guiding plate include guiding channels adapted to guide the unvulcanized mixed rubber from the rubber injection hole into respective longitudinally extending rubber injection channels.

Preferably, the transfer molding mold comprises a plurality of transversely extending rubber injection channels extending out from each of the longitudinally extending rubber injection channels.

Preferably, the longitudinally extending rubber injection channels extend in the vertical direction, and the transversely extending rubber injection channels extend in the horizontal direction.

Preferably, a plurality of rubber outlets to which the plurality of transversely extending rubber injection channels extend are staggered on the surface of the last mold.

Preferably, the longitudinally extending rubber injection channel has a diameter of 10 to 20 mm, and the transversely extending rubber injection channel has a diameter of 2 to 5 mm.

Preferably, the transfer molding mold comprises a pair of last molds corresponding to a pair of boots, the tube mold comprises two inner cavities corresponding to the pair of last molds, and the pair of last molds are adapted to being mounted in the two inner cavities, respectively, thereby forming a pair of vulcanized rubber boot transfer molding cavities.

Preferably, the partition elements of the last mold consist of two partition plates which extend towards the front side and the rear side from the last mold, respectively; when the last mold is mounted in the corresponding inner cavity of the tube mold, the two partition plates partition the corresponding transfer molding cavity into a left compartment and a right compartment.

Preferably, the tube mold comprises a left tube mold and a right tube mold which are mutually fitted to mount; and the two partition plates partition the left compartment and right compartment corresponding to the left tube mold and the right tube mold.

Preferably, the partition elements of the last mold consist of three partition elements; when the last mold is mounted in the tube mold, the three partition elements partition the transfer molding cavity into three compartments: a middle compartment, a left compartment, and a right compartment.

Preferably, the tube mold comprises three tube mold portions which may be mutually fitted to mount; and the three partition elements partition the middle compartment, the left compartment, and the right compartment corresponding to the three tube molds, respectively.

Preferably, the transfer molding cavity corresponds to a rubber portion of the vulcanized rubber boot, the rubber portion entirely covering the tube portion attached with the inner lining or partially covering the tube portion attached with the inner lining.

Preferably, the transfer molding mold comprises a second last mold without partition elements, adapted to being mounted in the inner cavity of the tube mold.

Preferably, the second last mold has a shape corresponding to the tube of the rubber boot so as to form a tube forming cavity between a wall of the inner cavity of the tube mold and an outer surface of the last mold without partition plates.

Preferably, the second last mold has a shape different from that of the tube of the rubber boot.

Preferably, an inner surface of the tube mold has a feature adapted to be bonded with a rubber surface.

Preferably, the transfer molding mold further comprises:
an outsole mold having an outsole rubber injection hole and an outsole mold cavity corresponding to a sole shape of the rubber boot, the outsole mold being adapted to transfer mold the sole of the rubber boot; the outsole mold having an outsole joining portion and being adapted to be closed to the top of the tube mold or the top of the rubber injection guiding plate via the outsole joining portion.

In another aspect of the disclosure, there is provide a rubber boot transfer molding apparatus, comprising:
the transfer molding mold according to any one of the above;
a high-pressure injection mechanism configured to pressurize and inject a prepared unvulcanized mixed rubber into the rubber injection hole of the transfer molding mold;
a mold moving mechanism configured to move respective parts of the transfer molding mold according to a preset procedure; and
a control mechanism configured to control operations of the mold moving mechanism and the high-pressure injection mechanism.

Preferably, the transfer molding apparatus further comprises a heating device configured to heat the unvulcanized mixed rubber.

Although the embodiments of the disclosure are described as being applied to a transfer molding process, they may also be applied to an injection molding process, which is also intended to be covered in the protection scope of the disclosure.

BRIEF DESCRIPTION OF DRAWINGS

The disclosure will become more apparent through the detailed description below with reference to the accompanying drawings, wherein identical reference numerals denote like or corresponding elements, wherein.

DETAILED DESCRIPTION OF EMBODIMENTS

Hereinafter, the technical solution will be described in further detail through embodiments with reference to the accompanying drawings; however, the present disclosure is not limited the embodiments described below.

In one aspect, inventors of the disclosure provide a transfer molding mold for guiding and injecting an unvulcanized mixed rubber so as to overcome drawbacks of rubber (e.g., unvulcanized mixed rubber), such as poor flowability, hard to implement injection molding or transfer molding into a rubber boot (e.g., an integrally formed vulcanized rubber boot). In another aspect, the inventors of the disclosure provide a relevant transfer molding mold, production line and production process to solve a technical problem of hardly implementing an integrally formed vulcanized rubber boot with an inner lining. An integrally formed vulcanized rubber boot with such apparatus or process also falls into the protection scope of the present disclosure.

Figure 1:
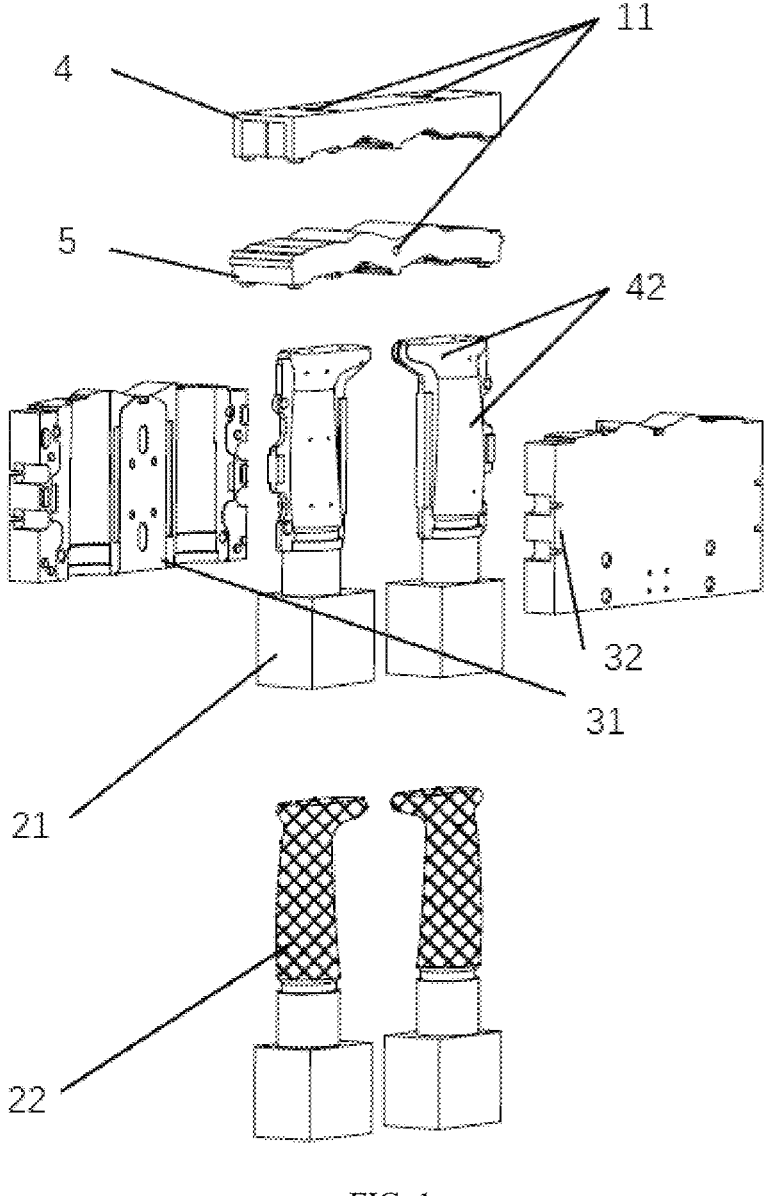
FIG. 1 is a schematic diagram showing a separated state of a transfer molding mold for vulcanized rubber boot according to an embodiment of the disclosure.

FIG. 1 shows a transfer molding mold for vulcanized rubber boot according to an embodiment of the disclosure. The transfer molding mold for vulcanized rubber boot comprises: a combined tube mold having an inner cavity corresponding to a tube of the rubber boot; a last mold with partition elements, the last mold comprising a body substantially corresponding to a shape of the tube of the rubber boot and two or more partition elements provided on the body; the last mold being adapted to mount in the inner cavity of tube mold so as to form a transfer molding cavity between a wall of the inner cavity of the tube mold and an outer appearance of the last mold, the transfer molding cavity being partitioned into two or more parts by the last mold and the tube mold, wherein the last mold further comprises a longitudinally extending rubber injection channel extending longitudinally downward from an upper surface of the last mold and a transversely extending rubber injection channel extending transversely from the longitudinally extending rubber injection channel till a rubber outlet on the surface of the last mold; and a rubber injection guiding plate adapted to be mounted to the top of the tube mold so as to guide injection of an unvulcanized mixed rubber, on the rubber injection guiding plate being provided: a rubber injection hole adapted to connect to an external injection needle for injecting the unvulcanized mixed rubber, and a rubber injection channel which communicate the rubber injection hole to the longitudinally extending rubber injection channel.

The transfer molding cavity is configured to transfer mold a rubber portion of the vulcanized rubber boot. Based on the construction of the last mold with partition elements and the construction of the tube mold, the transfer molding cavity is configurable to transfer mold different numbers of sheets, the sheets being bonded in a subsequent step to form the rubber portion of the vulcanized rubber boot.

The rubber injection guiding plate 5 comprises a plate body of a substantially square shape, the plate body being made of a material suitable for manufacturing a high-pressure mold.

A rubber injection hole 11 may be provided on the plate body. The rubber injection hole 11 may be connected to an external injection head to inject an unvulcanized mixed rubber. A rubber injection channel is further provided on the plate body.

The transfer molding mold for vulcanized rubber boot comprises two or more longitudinally extending rubber injection channels distributed along a longitudinal section of the last mold 21.

The rubber injection channels on the rubber injection guiding plate comprises a guiding channel adapted to guide the unvulcanized mixed rubber from the rubber injection hole to respective longitudinally extending rubber injection channels.

The transfer molding mold for vulcanized rubber boot comprises a plurality of transversely extending rubber injection channels extending out from each longitudinally extending rubber injection channel.

The longitudinally extending rubber injection channels extend in a vertical direction, and the transversely extending rubber injection channels extend in a horizontal direction.

Outlets of the plurality of transversely extending rubber injection channels are staggered on the surface of the last mold.

Figure 7:
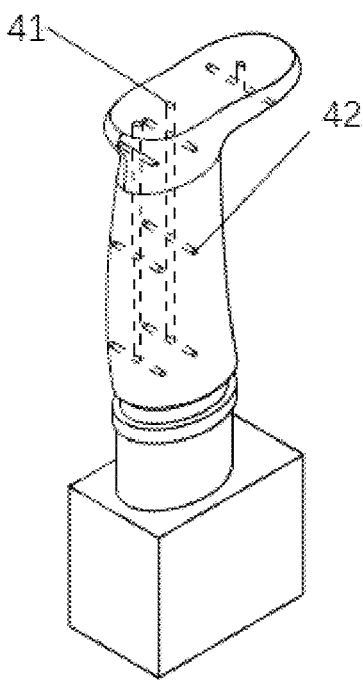
FIG. 7 is a perspective view of a last mold of the transfer molding mold for vulcanized rubber boot according to an embodiment, showing distribution of a rubber injection channel inside the last mold.
Figure 8A:
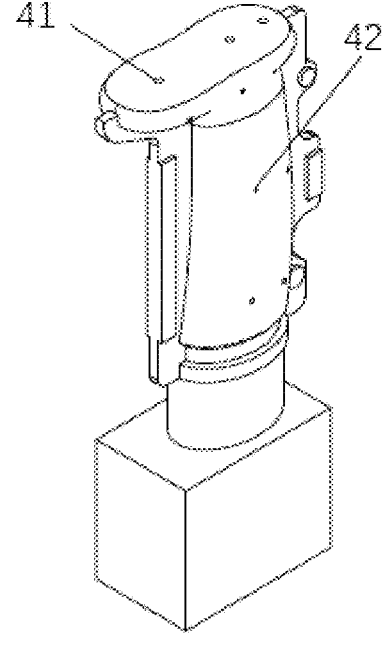
FIG. 8a and FIG. 8b are perspective views of a last mold of the transfer molding mold for vulcanized rubber boot according to an embodiment, showing distribution of a rubber injection channel on a surface of the last mold.
Figure 8B:
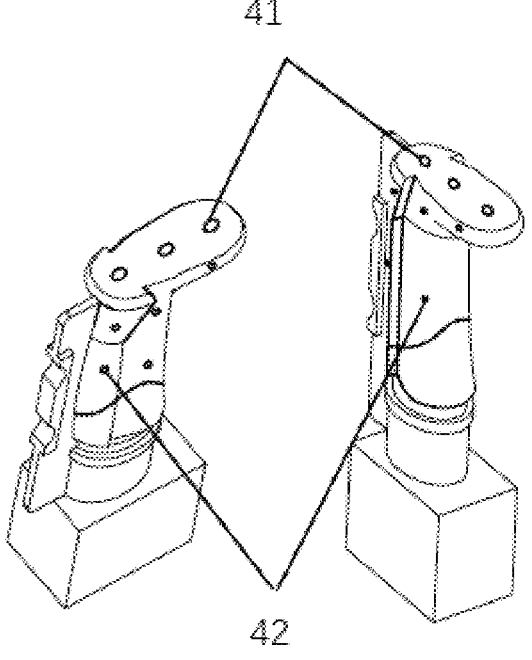

FIG. 7 is a perspective view of a last mold of a transfer molding mold for vulcanized rubber boot according to an embodiment of the disclosure, showing distribution of the rubber injection channels in the mold. FIGS. 8a and 8b are stereoscopic views of a last mold of a transfer molding mold according an embodiment of the disclosure, showing distribution of the rubber injection channels on the surface of the last mold.

FIG. 7 shows three longitudinal rubber injection channels, each longitudinal rubber injection channel communicating with one or more transversely extending rubber injection channels, the transversely extending rubber injection channel communicating with a rubber outlet 42. As illustrated in the figure, a rubber injection hole 41 is provided on the top of the last mold and communicates with an outlet of the rubber injection channels on the rubber injection guiding plate 5.

In a preferred embodiment, the longitudinally extending rubber injection channel has a diameter of 10 to 20 mm, and the transversely extending rubber injection channel has a diameter of 2 to 5 mm. Other appropriate diameters are also possible.

As illustrated in FIG. 1, according to an embodiment of the disclosure, the transfer molding mold for vulcanized rubber boot comprises a pair of last molds corresponding to a pair of boots, and the tube mold comprises two inner cavities corresponding to the pair of last molds, wherein the pair of last molds are adapted to be mounted in the two inner cavities, respectively, forming a pair of vulcanized rubber boot transfer molding cavities.

In an alternative embodiment, the vulcanized boot transfer molding mold comprises one last mold corresponding to one boot, and the tube mold comprises an inner cavity corresponding to the one last mold, wherein the last mold is adapted to be mounted in the inner cavity, forming a vulcanized rubber boot transfer molding cavity.

In the embodiment illustrated in FIG. 1, partition elements of each last mold include two partition plates which extend forwards and rearwards from the last mold, respectively; when the last mold is mounted in the corresponding inner cavity of the tube mold, the two partition plates partition the corresponding transfer molding cavity into a left compartment and a right compartment.

In the embodiment illustrated in FIG. 1, the tube mold comprises a left tube mold and a right tube mold which may be fitted with each other; the two partition plates separate the left compartment and the right compartment corresponding to the left tube mold and the right tube mold.

Figure 2:
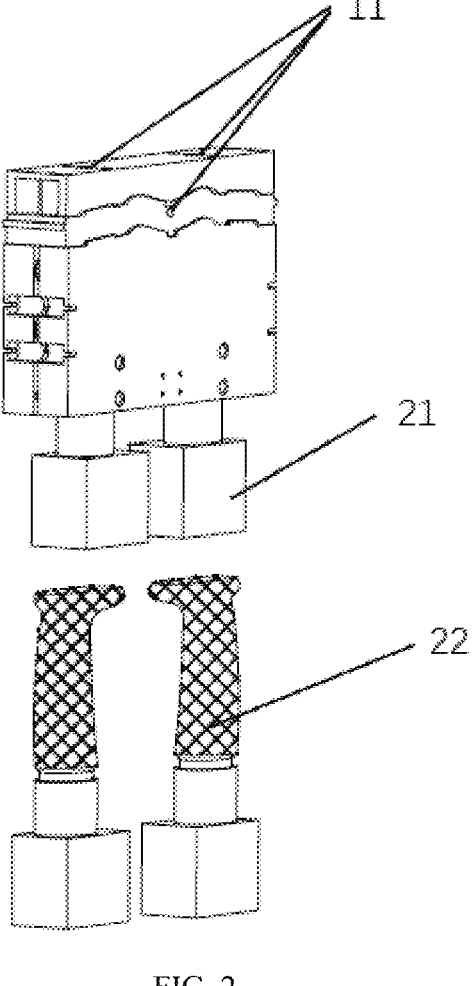
FIG. 2 is a schematic diagram showing a closed state of the transfer molding mold for vulcanized rubber boot according to the embodiment of FIG. 1.

FIG. 2 is a schematic diagram showing a closed state of the transfer molding mold for vulcanized rubber boot according to an embodiment of the disclosure, wherein the two last molds 21 are enclosed by the left tube mold 31 and the right tube mold 32, the rubber injection guiding plate is closed to the top of the molds, thereby forming a complete transfer molding cavity in the transfer molding mold. An outsole mold is closed to the top of the rubber injection guiding plate. In this embodiment, the heated unvulcanized mixed rubber may be injected into the transfer molding cavity via the rubber injection hole 11 to form two separate vulcanized rubber boot sheets. The heated unvulcanized mixed rubber injected into the outsole mold via the rubber injection hole 11 forms an outsole.

Figure 3:
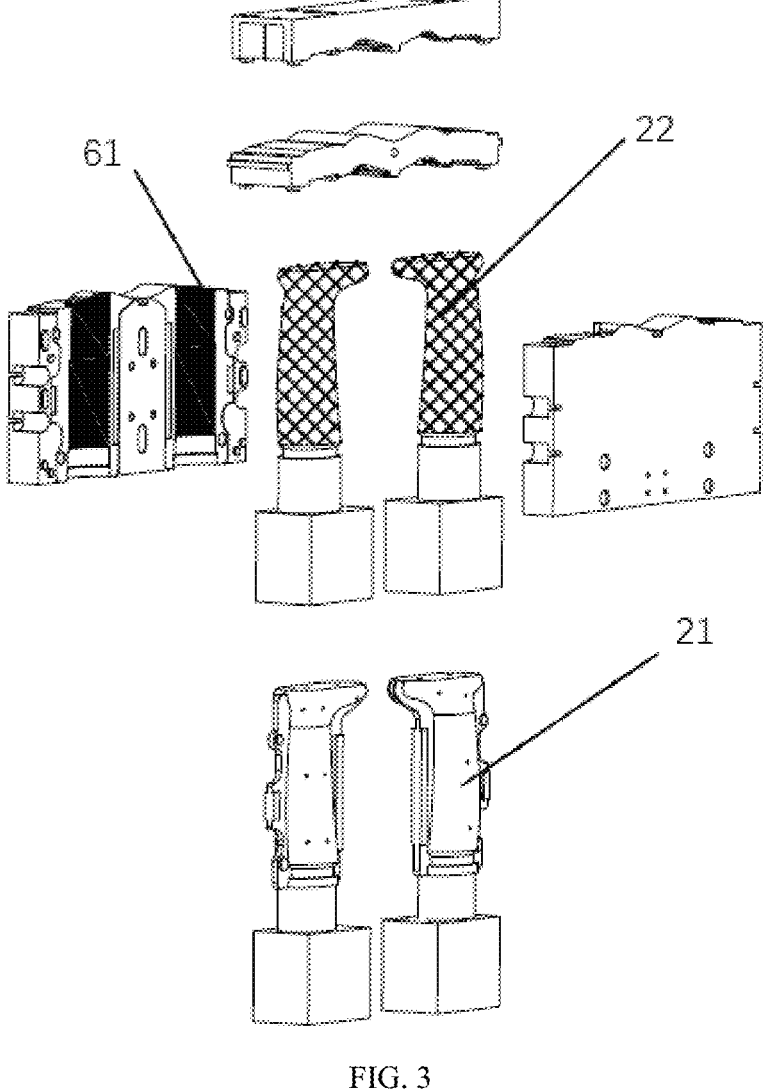
FIG. 3 is a schematic diagram showing another separated state of the transfer molding mold for vulcanized rubber boot according to the embodiment of FIG. 1.

FIG. 3 is a schematic diagram showing another separated state of the transfer molding mold for vulcanized rubber boot according to an embodiment of the disclosure, wherein the last mold 21 with the partition elements is removed, and the last mold 22 without a partition element is sleeved with an inner lining and placed in.

Figure 4:
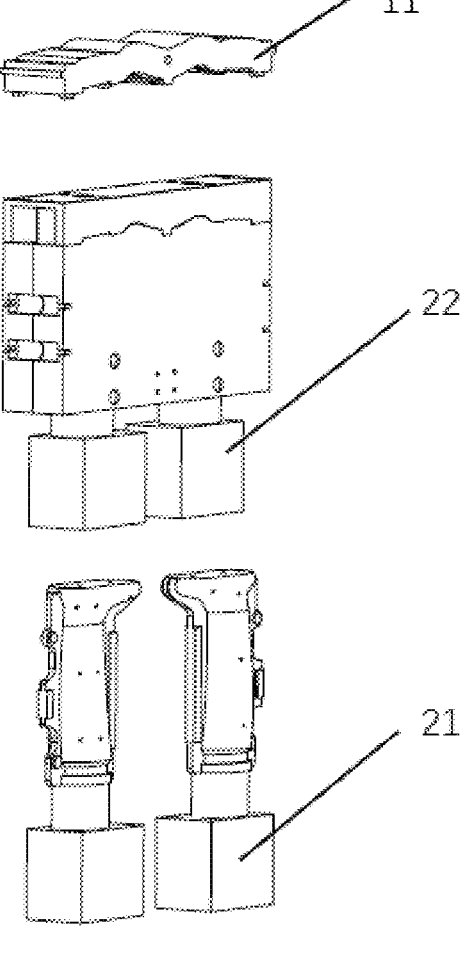
FIG. 4 is a schematic diagram showing another closed state of the transfer molding mold for vulcanized rubber boot according to the embodiment of FIG. 1.

FIG. 4 is a schematic diagram showing another closed state of a transfer molding mold for vulcanized rubber boot according to an embodiment, wherein the last mold 22 without a partition element is enclosed by the left tube mold 31 and the right tube mold 32, and the outsole mold is closed to the mold top. At this point, the vulcanized rubber boot sheets, the outsole, and the inner lining are bonded with each other to form a complete vulcanized rubber boot.

Figure 5:
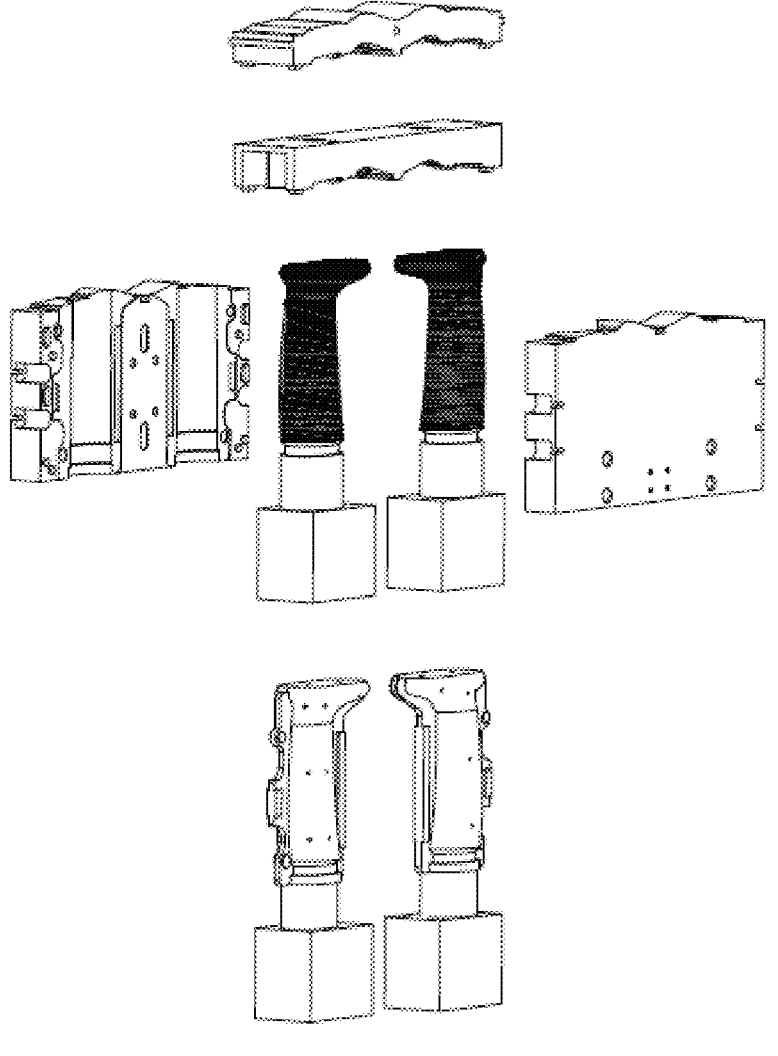
FIG. 5 is a schematic diagram showing a separated state of the transfer molding mold for vulcanized rubber boot after accomplishment according to an embodiment of FIG. 1.

FIG. 5 is a schematic diagram showing a separated state of the transfer molding mold for vulcanized rubber boot after accomplishment according to an embodiment of the disclosure, wherein the completely formed vulcanized rubber boot is formed on the last mold.

Figure 6A:
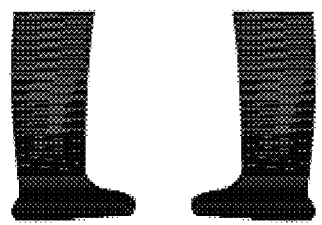
FIGS. 6a and 6b are schematic diagrams showing a vulcanized rubber boot fabricated by the transfer molding mold for vulcanized rubber boot according to an embodiment.
Figure 6B:
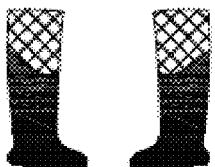

FIGS. 6a and 6b are schematic diagrams of a vulcanized rubber boot fabricated by a transfer molding mold for vulcanized rubber boot according to an embodiment of the disclosure. FIG. 6a shows an example of an inner lining-attached tube portion of a vulcanized rubber boot completely covered with vulcanized rubber, and FIG. 6b is an example of an inner lining-attached tube portion of a vulcanized rubber boot partially covered with vulcanized rubber. The inner lining-attached tube portion shown in FIG. 6b may be controlled by adjusting the shape of the formed transfer molding cavity.

Figure 9:
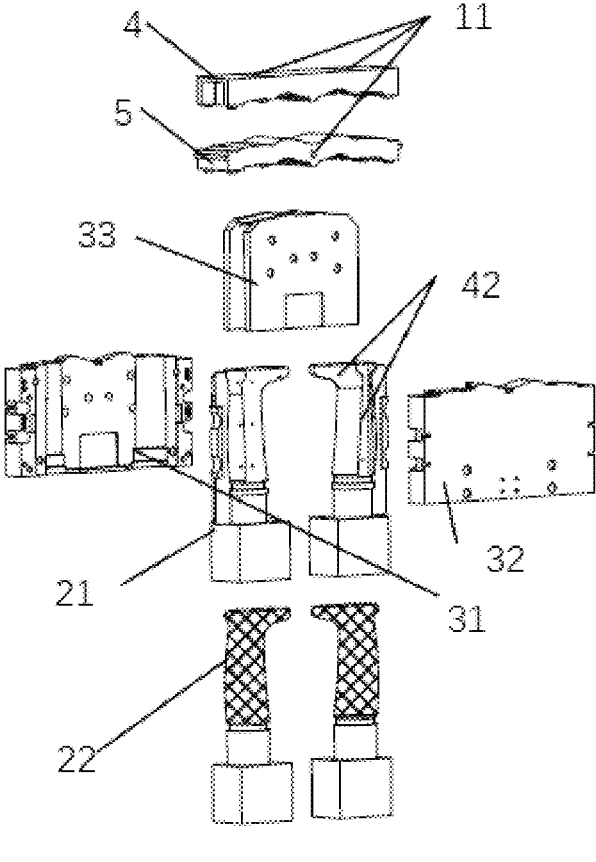
FIG. 9 is a schematic diagram showing a separated state of a transfer molding mold for vulcanized rubber boot according to another embodiment of the disclosure.
Figure 10:
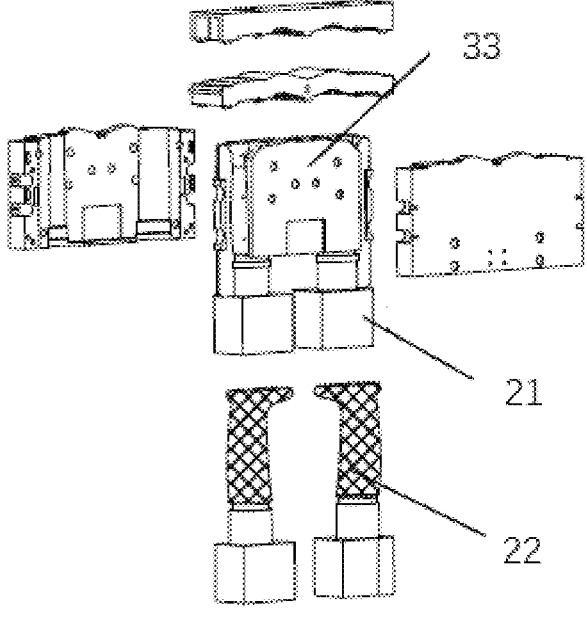
FIG. 10 is a schematic diagram showing a partially closed state of the transfer molding mold for vulcanized rubber boot according to another embodiment of the disclosure.
Figure 11:
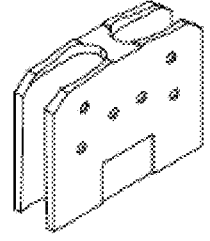
FIG. 11 is stereoscopic view of a front tube mold of the transfer molding mold for vulcanized rubber boot according to another embodiment of the disclosure.

According to another embodiment, as shown in FIGS. 9 to 11, the partition elements of the last mold include three partition elements; when the last mold is mounted in the tube mold, the three partition elements partition the transfer molding cavity into three compartments: middle compartment, left compartment, and right compartment. The three partition elements for example include a rear-side partition plate and the left-side and right-side step portions. In this case, the tube mold comprises three tube mold portions which may be fitted with each other, e.g., left tube mold, right tube mold, and front tube mold. The three partition elements separate the middle compartment, left compartment, and right compartment respectively corresponding to the three tube molds.

FIG. 11 is a stereoscopic view of the front tube mold 33. FIG. 10 is a schematic view showing that two last molds with partition elements are inserted in the front tube mold 33. In this example, the left tube mold and the right tube mold may be closed from two sides, thereby enclosing the last mold and the front tube mold and forming a complete transfer molding cavity.

The three partition elements may separate the transfer molding cavity portions corresponding to the three tube molds. The three separated compartments correspond to shapes of corresponding portions of the tube of the rubber boot, such that three sheets of separate tube portions may be formed during the transfer molding process of the rubber compound. The three sheets of separate tube portions may be joined subsequently to form a complete tube.

The orientation terms such as front, rear, left and right are defined relative to each last mold, wherein the front refers to the direction where the tip portion of the last mold is oriented. and the upper and lower orientations are defined relative to the upper and lower directions in the image surface of FIG. 1.

According to the present disclosure, the transfer molding mold for vulcanized rubber boot further comprises a second last mold 22 without partition elements, which is adapted to be mounted in the inner cavity of the tube mold.

The second last mold may have a shape corresponding to the tube of the rubber boot so as to form an tube forming cavity between the wall of the inner cavity of the tube mold and the outer surface of the last mold without partition plates.

According to an alternative embodiment, the second last mold may have a shape different from the tube of the rubber boot.

Preferably, an inner surface of the tube mold has a feature adapted to be bonded with a rubber surface.

According to an embodiment of the disclosure, there are two types of last molds: the first last mold 21 with partition elements and the second last mold 22 without partition elements.

The second last mold 22 without partition elements is sleeved with an inner lining before use. The inner lining may be a thicker one, e.g., a textile fabric, a foamed material, a composite material formed by a textile fabric and a foamed material, a composite material formed by a textile fabric and a thermally insulative material, or a composite material formed by a textile fabric, a foamed material, and a thermally insulative material. The fabricating method according to the present disclosure is particularly advantageous to integrally fabricate a vulcanized rubber boot with a thick inner lining.

According to a preferred embodiment of the disclosure, the transfer molding mold for vulcanized rubber boot further comprises: an outsole mold having an outsole rubber injection hole and an outsole mold cavity corresponding to a sole profile of the rubber boot, the outsole mold being configured to transfer molding the sole of the rubber boot; the outsole mold has an outsole joining portion and is adapted to close to the top of the tube mold or the top of the rubber injection guiding plate via the outsole joining portion.

In an alternative embodiment, the second last mold may have a profile different from the tube of the rubber boot. The second last mold mainly serves to support the inner lining. The second last mold may have an inflation channel adapted to connect to an external pressurized gas source, and a vent hole provided on the surface and adapted to discharge the external pressurized gas from the surface, thereby pushing the inner lining to conformally attach the tube and applying a predetermined pressure against the tube to facilitate mutual bonding between respective separate tube portions.

In a preferred embodiment, an airbag is provided on the second last mold. Since the inner lining might be air permeable, the applied pressure might be uneven; by providing a layer of airbag between the inner lining and the second last mold, the pressure may be uniformly applied against the inner lining and the tube. The airbag may enclose the second last mold, for example.

According to the disclosure, the top of the tube mold and the bottom of the rubber injection guiding plate have joining parts fitted to each other, and the rubber injection guiding plate is adapted to be closed to the top of the tube mold via the joining parts. For example, as illustrated in FIG. 1, the concave-convex portions may be fitted to the corresponding concave-convex portions on the top of the tube mold. Other kinds of joining elements are also allowed.

According to the disclosure, the transfer molding mold may further comprise an outsole mold 4 having a rubber injection hole 11 and an outsole mold cavity corresponding to the sole profile of the rubber boot; the outsole mold 4 is configured to transfer mold the sole of the rubber boot. The outsole mold 4 has an outsole joining portion and is adapted to be closed to the top of the tube mold or the top of the rubber injection guiding plate via the outsole joining portion as required.

According to another aspect of the disclosure, there is provided a rubber boot transfer molding apparatus, comprising: a transfer molding mold according to any one of the embodiments above; a high-pressure injection mechanism configured to pressurize and inject the prepared unvulcanized mixed rubber into a rubber injection hole of the transfer molding mold; a mold moving mechanism configured to move respective parts of the transfer molding mold according to a preset procedure; and a control mechanism configured to control operations of the mold moving mechanism and the high-pressure injection mechanism.

The transfer molding apparatus may further comprise a heating device configured to heat the unvulcanized mixed rubber. For example, when the tube mold and the second last mold are closed such that the plurality of separate tube portions form an integral tube, or preferably after the outsole is bonded to the tube, the preliminarily formed rubber boot is heated (and pressurized via another device) for vulcanization.

Operations of the transfer molding mold and the transfer molding apparatus according to the disclosure may refer to the following fabricating method.

A further aspect of the disclosure provides a method for fabricating a vulcanized rubber boot using the above transfer molding apparatus. For example, the method comprises the following steps:

1. Separating respective parts of the tube mold, and moving the last mold with partition elements into respective portions of the tube mold.
2. Closing the tube mold to accommodate the last mold with partition elements into an appropriate place in the tube mold, wherein the molds may be fixed in place by an appropriate locating and clamping device.

For example, the last mold with partition elements may be positioned in the tube mold by joining the partition elements or positioning steps with the positioning elements of the tube mold. An additional fixing device may be provided in the transfer molding apparatus to fix the tube mold and the last mold in pace. For example, a hydraulic positioning device may be provided.

FIG. 8b shows the partition elements and positioning steps on the last mold with partition elements according to an embodiment of the disclosure.

3. Positioning and fixing the rubber injection guiding plate on the top of the tube mold.

As discussed above, mutually fitted positioning elements may be provided at the lower portion of the rubber injection guiding plate and the top of the tube mold. An additional fixing device may be provided in the transfer molding apparatus to fix the rubber injection guiding plate and the tube mold in place. For example, a hydraulic positioning device may be provided. In this example, the outlets of the rubber injection channels of the rubber injection guiding plate communicate with the inlets of the longitudinally extending rubber injection channels at the top of the last mold.

4. Injecting rubber (unvulcanized mixed rubber) via rubber injection holes in the rubber injection guiding plate, whereby to inject unvulcanized mixed rubber into the longitudinally extending rubber injection channels of the last mold via the rubber injection holes of the rubber injection guiding plate and then inject unvulcanized mixed rubber into the transversely extending rubber injection channels, such that the unvulcanized mixed rubber enters the transfer molding cavity between the tube mold and the last mold with partition elements.

The rubber injection mechanism may maintain a high pressure to realize injection of the unvulcanized mixed rubber. In this example, since the unvulcanized mixed rubber is guided into the divided transfer molding cavity via the staggered rubber injection outlets on the surface of the last mold, the pressure needed for rubber injection decreases and the unvulcanized mixed rubber is uniformly distributed into the transfer molding cavity. The unvulcanized mixed rubber in the rubber injection mechanism may be heated appropriately to improve its flowability.

5. Opening the tube mold to remove the last mold with partition elements.

Now, since the unvulcanized mixed rubber is shaped in the partitioned transfer molding cavity under the action of pressure and temperature, two or more separated portions of the tube are formed. When the last mold with partition elements is removed, these portions maintain bonded with the corresponding portions of the tube mold. For example, this may be realized by selecting the materials for the tube mold and the last mold with partition elements, e.g., the inner surface of the tube mold has a rougher surface; or realized by a temperature difference between the last mold and the tube mold; or realized by providing a feature, easily joined with the tube portions, on the inner surface of the tube mold.

6. Sleeving an inner lining over the second last mold without partition elements and moving the second last mold without partition elements between the tube mold portions.
7. Closing the tube mold to accommodate the second last mold without partition elements into an appropriate place in the tube mold.

The positioning of the second last mold in the tube mold is similar to the last mold with partition elements.

In this stage, the tube mold is closed; the tube mold and the second last mold without partition elements jointly apply pressure to various portions of the tube and the inner lining so as to bond them together.

Since the tube mold has a combined design, i.e., including two, three or more portions, the various portions of the tube mold may be separated for accommodating the last mold or the second last mold, or may be closed to fit with the last mold with partition elements to form a divided transfer molding cavity (for transfer molding the rubber portions of the rubber boot), or may be fit with the second last mold without partition elements to form a complete tube shaping cavity. When the last mold with partition elements is removed, the resulting separated portions of the tube of the rubber boot remain on the respective portions of the tube mold; after the second last mold with the inner lining is inserted and the respective portions of the tube mold are closed, the resulting respective separated portions of the tube of the rubber boot may be joined with each other and joined with the inner lining.

A gas inflation channel may be provided in the second last mold, wherein the high-pressure gas is supplied from an external gas pressure source; after the mold is closed, a pressurized gas is supplied to the surface of the second last mold so as to press the inner lining sleeved over the second last mold surface towards the inner surface of the tube of the rubber boot, thereby facilitating mutual bonding.

8. Vulcanizing the unvulcanized mixed rubber.

For example, vulcanization is carried out by heating the closed mold with a heating device disposed nearby the mold to thereby heat the tube and the second last mold and by pressurizing the tube of the rubber boot with the pressurized gas. Now, a complete tube is jointly formed by various portions of the tube and the inner lining.

In addition, the method may further comprise the following steps before vulcanizing the unvulcanized mixed rubber: closing the outsole mold (e.g., clamping the outsole mold to the top of the rubber injection guiding plate), and injecting rubber via the outsole rubber injection holes of the outsole mold to form a boot sole; removing the rubber injection guiding plate from the tube mold, and fitting the outsole mold with the tube mold (such that the outsole is bonded with the tube and the inner lining is attached to the outsole and the tube). Now, the unvulcanized mixed rubber is vulcanized such that the tube, the sole, and the inner lining are wholly vulcanized to form an integral vulcanized rubber boot.

The method may further comprise: removing the outsole mold upon completion of the vulcanization, and opening the tube mold, such that the vulcanized rubber boot, together with the second last mold without partition elements, is withdrawn out of the transfer molding apparatus.

The method may further comprise: detaching the vulcanized rubber boot from the second last sole without partition elements via a gas pressure device. For example, pressurized gas is directly supplied to the second last mold when an inflation channel is provided in the second last mold.

According to a further aspect of the disclosure, there is provided an integrally transfer molded vulcanized rubber boot, comprising: a tube, a sole, and an inner lining, which are integrally transfer molded, wherein the tube has a front parting line and a rear parting line; or the tube has a left parting line, a right parting line, and a rear parting line; or the tube has more parting lines.

Preferably, the integrally transfer molded rubber boot is fabricated using the method described above.

When orientation terms denoting "left," "middle," "right," "front," "rear," "middle," "upper," and "lower" mentioned herein are only intended to clearly express the relative positions of parts, not intended for any limitation. Generally, such orientations are defined relative to the orientation of the last mold.

The embodiments of the disclosure are not limited to those described above. Those skilled in the art may make various modifications and improvements to the disclosure in forms and details without departing from the spirit and scope of the disclosure, while all of such modifications and improvements are deemed to fall into the protection scope of the disclosure.

The invention claimed is:

1. A transfer molding mold for vulcanized rubber boot, comprising:
   a combined tube mold having an inner cavity corresponding to a tube of the rubber boot;
   a last mold with partition elements, comprising a body substantially corresponding to a shape of the tube of the rubber boot and two or more partition elements provided on the body; the last mold being adapted to mount in the inner cavity of the tube mold so as to form a transfer molding cavity between a wall of the inner cavity of the tube mold and an outer surface of the last mold, the transfer molding cavity being partitioned into two or more parts by the last mold and the tube mold, wherein the last mold further comprises a longitudinally extending rubber injection channel extending longitudinally downward from an upper surface of the last mold and a transversely extending rubber injection channel extending transversely from the longitudinally extending rubber injection channel to a rubber outlet on the surface of the last mold; and
   a rubber injection guiding plate adapted to be mounted to a top of the tube mold so as to guide injection of unvulcanized mixed rubber, the rubber injection guiding plate is provided with a rubber injection hole adapted to connect to an external injection head for injecting the unvulcanized mixed rubber, and a rubber injection channel which communicates the rubber injection hole to the longitudinally extending rubber injection channel.

2. The transfer molding mold for vulcanized rubber boot of claim 1, comprising two or more longitudinally extending rubber injection channels distributed along a longitudinal section of the last mold.

3. The transfer molding mold for vulcanized rubber boot of claim 1, wherein rubber injection channels of the rubber injection guiding plate include guiding channels adapted to guide the unvulcanized mixed rubber from the rubber injection hole into respective longitudinally extending rubber injection channels.

4. The transfer molding mold for vulcanized rubber boot of claim 1, comprising: a plurality of transversely extending rubber injection channels extending out from each of longitudinally extending rubber injection channels.

5. The transfer molding mold for vulcanized rubber boot of claim 4, wherein the longitudinally extending rubber injection channels extend in a vertical direction, and the transversely extending rubber injection channels extend in a horizontal direction.

6. The transfer molding mold for vulcanized rubber boot of claim 4, wherein a plurality of rubber outlets to which the plurality of transversely extending rubber injection channels extend are staggered on the surface of the last mold.

7. The transfer molding mold for vulcanized rubber boot of claim 4, wherein the longitudinally extending rubber injection channel has a diameter of 10 to 20 mm, and the transversely extending rubber injection channel has a diameter of 2 to 5 mm.

8. The transfer molding mold for vulcanized rubber boot of claim 1, comprising: a pair of last molds corresponding to a pair of boots, the tube mold comprises two inner cavities corresponding to the pair of last molds, and the pair of last molds are adapted to being mounted in the two inner cavities, respectively, thereby forming a pair of vulcanized rubber boot transfer molding cavities.

9. The transfer molding mold for vulcanized rubber boot of claim 1, wherein the partition elements of the last mold consist of two partition plates which extend towards a front side and a rear side from the last mold, respectively; when the last mold is mounted in the corresponding inner cavity of the tube mold, the two partition plates partition the corresponding transfer molding cavity into a left compartment and a right compartment.

10. The transfer molding mold for vulcanized rubber boot of claim 9, wherein the tube mold comprises a left tube mold and a right tube mold which are mutually fitted to mount; and the two partition plates partition the left compartment and right compartment corresponding to the left tube mold and the right tube mold.

11. The transfer molding mold for vulcanized rubber boot of claim 1, wherein the partition elements of the last mold consist of three partition elements; when the last mold is mounted in the tube mold, the three partition elements partition the transfer molding cavity into three compartments: a middle compartment, a left compartment, and a right compartment.

12. The transfer molding mold for vulcanized rubber boot of claim 11, wherein the tube mold comprises three tube mold portions which may be mutually fitted to mount; and
   the three partition elements partition the middle compartment, the left compartment, and the right compartment corresponding to the three tube molds, respectively.

13. The transfer molding mold for vulcanized rubber boot of claim 1, wherein the transfer molding cavity corresponds to a rubber portion of the vulcanized rubber boot, the rubber portion entirely covering the tube attached with an inner lining or partially covering the tube attached with the inner lining.

14. The transfer molding mold for vulcanized rubber boot of claim 1, further comprising:

a second last mold without partition elements, adapted to being mounted in the inner cavity of the tube mold.

15. The transfer molding mold for vulcanized rubber boot of claim 14, wherein the second last mold has a shape corresponding to the tube of the rubber boot so as to form a tube forming cavity between a wall of the inner cavity of the tube mold and an outer surface of the last mold without partition plates.

16. The transfer molding mold for vulcanized rubber boot of claim 14, wherein the second last mold has a shape different from that of the tube of the rubber boot.

17. The transfer molding mold for vulcanized rubber boot of claim 1, wherein an inner surface of the tube mold has a feature adapted to be bonded with a rubber surface.

18. The transfer molding mold for vulcanized rubber boot of claim 1, further comprising:

an outsole mold having an outsole rubber injection hole and an outsole mold cavity corresponding to a sole shape of the rubber boot, the outsole mold being adapted to transfer mold the sole of the rubber boot; the outsole mold having an outsole joining portion and being adapted to be closed to the top of the tube mold or a top of the rubber injection guiding plate via the outsole joining portion.

19. A rubber boot transfer molding apparatus, comprising:

the transfer molding mold according to claim 1;

a high-pressure injection mechanism configured to pressurize and inject a prepared unvulcanized mixed rubber into the rubber injection hole of the transfer molding mold;

a mold moving mechanism configured to move respective parts of the transfer molding mold according to a preset procedure; and a control mechanism configured to control operations of the mold moving mechanism and the high-pressure injection mechanism.

20. The transfer molding apparatus of claim 19, further comprising a heating device configured to heat the unvulcanized mixed rubber.

* * * * *